2,753,269

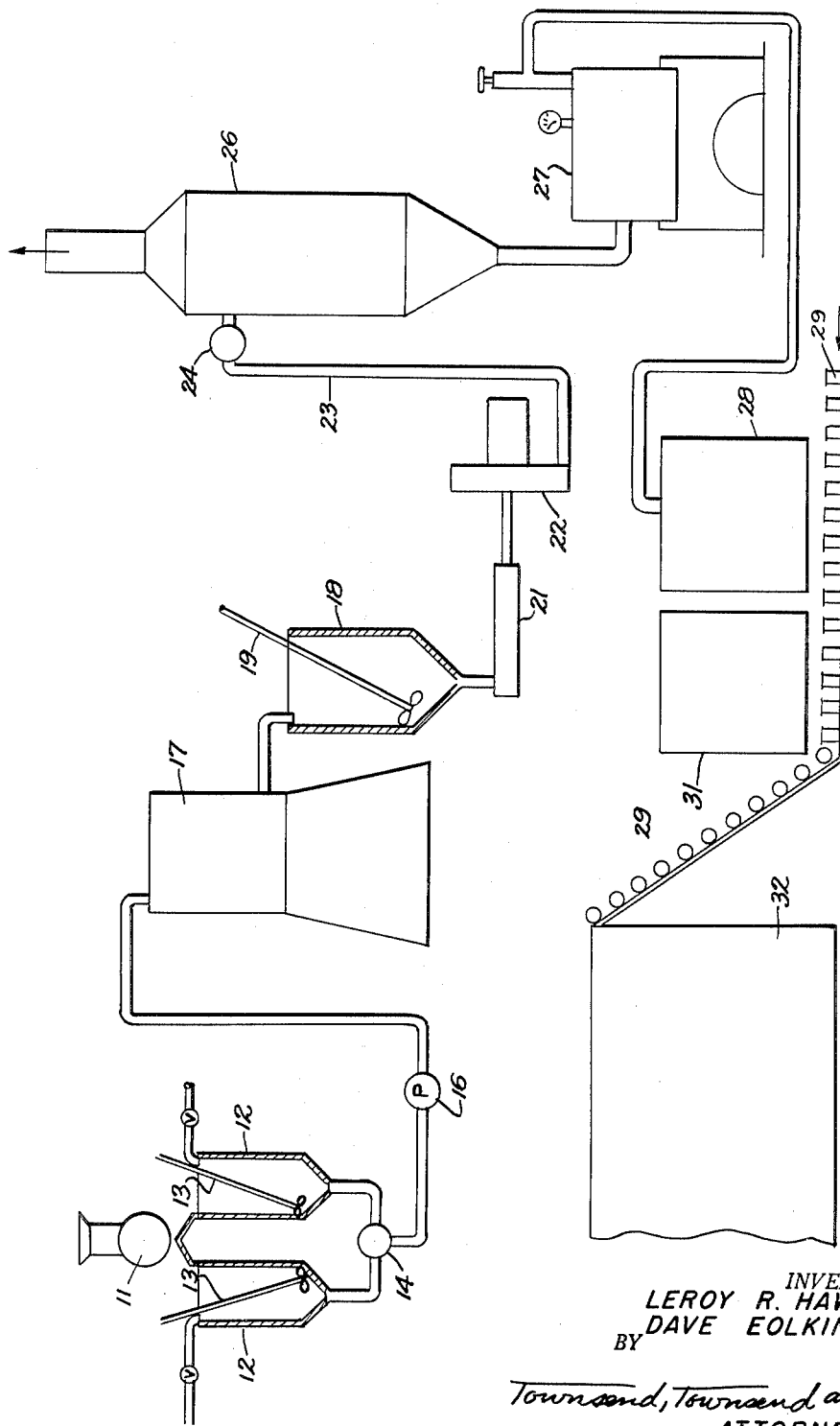
INVENTORS
LEROY R. HAWK
DAVE EOLKIN
BY Townsend, Townsend and Hoppe
ATTORNEYS 2,753,269
Patented July 3, 1956

PROCESS FOR PRODUCING A STRAINED MEAT PRODUCT

Le Roy R. Hawk and Dave Eolkin, San Lorenzo, Calif., assignors to Gerber Products Company, Fremont, Mich., a corporation of Michigan Application June 15, 1953, Serial No. 361,548

8 Claims. (Cl. 99—187)

This invention relates to new and useful improvements in process for producing a strained meat product.

The production of strained meat products such as those employed in infants' food in commercial canneries requires the cooking of the product after it has been packed in containers. Rapid production of strained meat products usually requires the use of a continuous pressure cooker during the operation of which cans are subjected to considerable agitation as they are conveyed through the helical path of travel which such commercial pressure cookers employ. One of the objections to the use of a continuous rotary pressure cooker is the fact that agitation and heat to which the containers of strained meat product are subjected result in denaturing of the protein content. Denaturing of the protein content results in clumping so that the cooked product sometimes has a curdled appearance similar to cottage cheese. Clumping of the protein content is undesirable in that it gives the product an unsatisfactory appearance.

The instant invention has for one of its objects the processing of strained meat products where the protein content of the product being filled in the containers is partially coagulated. Partial coagulation of the protein content preliminary to cooking reduces or eliminates clumping. This reduction of clumping may be due to the fact that denaturing of the protein content during precoagulation prevents further denaturing when the product is cooked.

Another object of the invention is partial coagulation of the protein content of the meat so that after retorting or whatever cooking process is subsequently employed a product of desirable consistency is obtained.

A further object of the invention is the de-aeration of the product by flash evaporating from a temperature above the boiling point of water to the boiling point of water. De-aeration reduces oxidation of the fats and other material in the meat.

The meat product which is produced by this process is of the general type of strained baby food meat and the like. Subjecting such products to the method of this invention results in a food which is more homogeneous and which is characterized by the absence of clumps of protein substance which would otherwise occur if the product were processed in a conventional rotary pressure cooker.

Reference is made to the accompanying flow sheet which illustrates schematically the steps of the instant invention.

In carrying out the method of the instant invention meat is deposited in a meat chopper 11 of conventional design where it is chopped in fine particles and then deposited in one of two tanks 12 where a slurry is formed upon the addition of hot water by means of stirrers 13. Liver, beef, chicken and bacon are typical examples of meats which may be processed in accordance with this invention. The two tanks 12 discharge through a three-way valve 14 so that the contents of either of the tanks may be processed as desired. The slurry of meat and hot water is withdrawn from tanks 12 by means of pump 16 which is desirably of a positive displacement rotary type of standard design. Pump 16 discharges into disintegrator 17, said disintegrator being desirably a rotary heater hammermill type which forces the slurry through a screen whereby the meat product is thoroughly strained. The fineness of the screen used in the disintegrator is preferably between .125″ and .033″. For liver and bacon the larger screen may be used, whereas for beef and chicken the smaller screen is desirable. Disintegrater 17 discharges into a surge tank 18 where the product is continuously agitated by stirrer 19. The level of product in tank 18 is maintained constant within reasonable limits. The product is withdrawn from tank 18 by means of pump 21, which pump desirably is manually adjustable to maintain a balanced flow throughout the system. For such purpose a Moyno pump is most suitable. Pump 21 forces the meat product into an agitating heater 22 which said heater may be of the type disclosed in U. S. Letters Patent No. 2,492,635 issued December 27, 1949 or in pending application Ser. No. 332,476, filed January 21, 1953 for Agitating Heater. Agitating heaters of the class herein referred to subject the product to a rapid increase in temperature by means of the addition of steam which is thoroughly mixed and violently agitated into the product. The rotor or blades of agitating heater 22 mechanically work the product while the temperature increase is being accomplished. Agitating heater 22, which is mechanically powered, promotes uniform heat transfer and prevents clumping of the coagulable material during the heating process. The rotor of said heater also serves to automatically wipe the orifice plate thereof clean of the "burned-on" film which naturally occurs in heating this type of proteinaceous material.

To complete the precoagulation of the protein content of the meat product, the material may be conducted from agitating heater 22 through a holding coil 23 where it is subjected to an elevated temperature such as in the range of 230–280° F., for a sufficient length of time, such as 10–30 seconds, to coagulate the protein to a desired percentage. It will be understood that the desired degree of precoagulation may be accomplished in the agitating heater 22 and when thus accomplished, employment of the holding coil 23 may be eliminated. In any event the temperature to which the meat slurry is subjected and the duration of subjection to such temperature is sufficient to partially coagulate the meat protein. A positive displacement pump 24 which may be a rotary pump is installed between heater 22 and separator 26. Pump 24 acts as a pressure release valve and also builds up a back pressure. Separator 26 which separates the liquid from the vapor may be a conventional vacuum flash evaporator. By reducing the pressure to atmospheric and the temperature to 212° F. de-aeration of the product is rapidly accomplished.

It will be observed that the employment of agitating heater 22, holding coil 23 and flash evaporator 26 carefully controls the temperature and duration of heating of the product so that the percentage of coagulation of protein content may be maintained within close limits.

The term "partial coagulation" of the protein content of the meat has been used in this specification. Actual determination of the percentage of coagulation is an extremely time consuming and difficult calculation. For practical purposes, such determination would not be made in commercial runs in a cannery because of the expense involved. The interest of one skilled in the art is in the end result, namely the consistency of the cooked product. Thus the temperature and duration of heating of the product is adjusted so that after the product is cooked the consistency is that desired, which actually means that the percentage of the protein coagulated prior to sealing in containers and retorting and the percentage of protein coagulated during retorting is controlled to produce the consistency of product which is commercially acceptable.

In order to improve the appearance of the final product, the de-aerated meat may be passed through a homogenizer 27 and thence transmitted to a can filler 28. From the filler the cans 29 are passed through a closing machine or seamer 31 and thence transmitted to a still retort or a rotary pressure cooker 32 where cooking is completed. It will be understood that during passage through the rotary pressure cooker 32, considerable agitating of the cans is inevitable. However, clumping of the meat product during such agitation is eliminated by reason of the fact that the pre-coagulation of the meat product has been accomplished as has heretofore been described.

What is claimed is:

1. A process for producing strained meat product which comprises the steps of comminuting meat mixed with water, partially coagulating the protein content of the product by application of heat prior to sealing in containers, sealing the product in containers, and completing the cooking of the product in containers.

2. A process for producing strained meat product which comprises the steps of mixing water and ground meat to form a slurry, straining the slurry, subjecting the strained slurry to heat and agitation to partially coagulate the protein content of the slurry, de-aerating the strained slurry, homogenizing the slurry, sealing the homogenized, partially coagulated product into containers, and completing the cooking of the product in containers.

3. A process for producing strained canned meat product which is characterized by partially coagulating the protein content of the meat by application of heat prior to sealing in containers and is further characterized by the absence of clumping of the product during heat sterilization thereof.

4. A process for producing strained meat product which comprises forming a slurry of meat and water, straining said slurry, injecting steam into said slurry while simultaneously mechanically violently agitating said slurry to partially coagulate the protein content thereof without clumping, de-aerating the partially coagulated product, sealing the product in containers, and completing the cooking of the product.

5. A process for producing strained meat product which comprises forming a slurry of meat and water, straining said slurry, injecting steam into said slurry while simultaneously mechanically violently agitating said slurry to partially coagulate the protein content thereof without clumping, de-aerating the partially coagulated product, homogenizing the product, sealing the product in containers, and completing the cooking of the product.

6. A process according to claim 5, characterized by the absence of clumping in the product and the controlled consistency of the final product.

7. A strained meat product produced by the process of claim 1.

8. A strained meat product produced by the process of claim 4 and characterized by freedom from clumping.

References Cited in the file of this patent

UNITED STATES PATENTS

| | | |
|---|---|---|
| 1,240,165 | Balzari | Sept. 18, 1917 |
| 1,557,053 | Hooper | Oct. 13, 1925 |
| 2,188,908 | Lavett | Feb. 6, 1940 |